Feb. 2, 1932.  L. CASALE  1,843,540
PROCESS FOR THE PRODUCTION OF HYDROGEN OR HYDROGEN NITROGEN
MIXTURES OR HYDROGEN CARBON MONOXIDE MIXTURES
Filed July 29, 1927
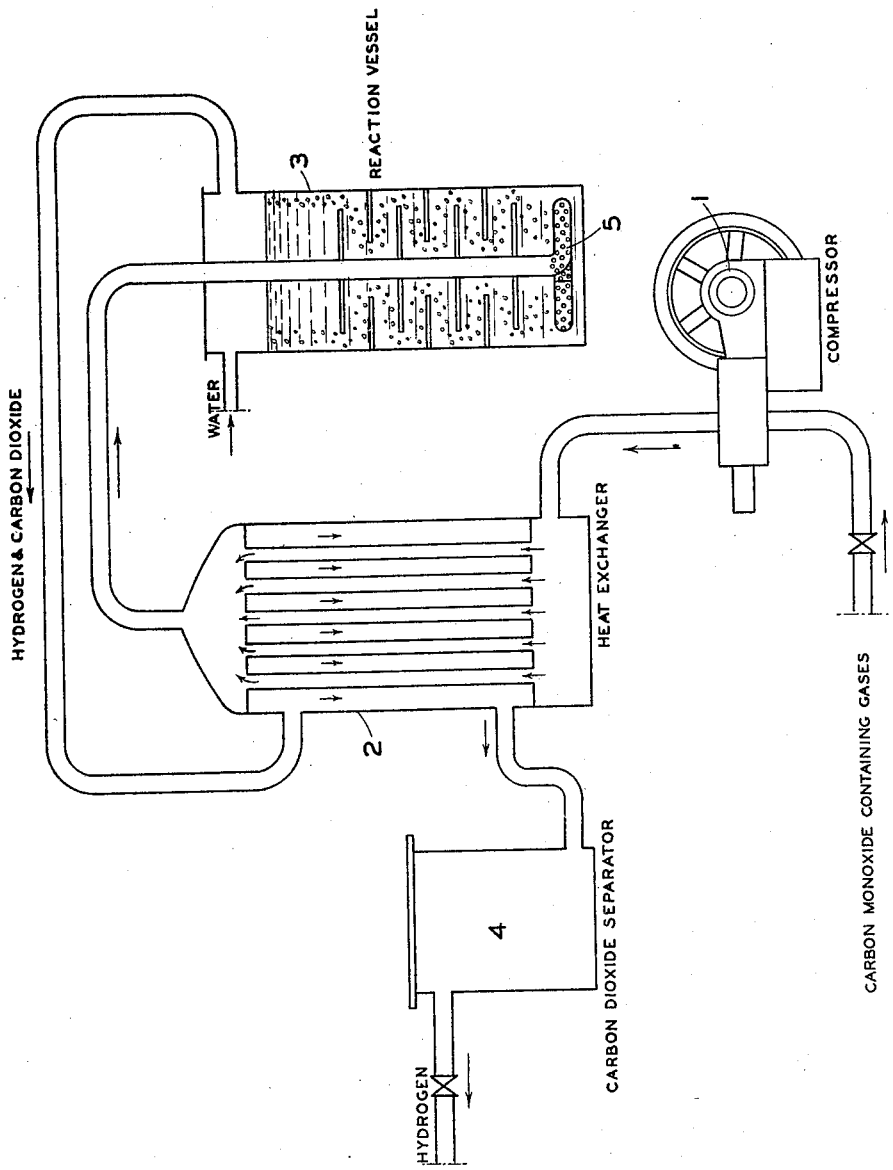
INVENTOR
LUIGI CASALE
BY
ATTORNEYS Patented Feb. 2, 1932

1,843,540

UNITED STATES PATENT OFFICE

LUIGI CASALE, DECEASED, LATE OF ROME, ITALY, BY MARIA CASALE, NÉE SACCHI, ADMINISTRATRIX, OF RAPALLO, GENOA, ITALY

PROCESS FOR THE PRODUCTION OF HYDROGEN OR HYDROGEN-NITROGEN MIXTURES OR HYDROGEN-CARBON MONOXIDE MIXTURES

Application filed July 29, 1927, Serial No. 209,395, and in Italy August 11, 1926.

As is well known carbon monoxide reacts with steam in the presence of a catalyst according to the equation

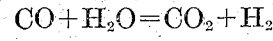

For the industrial production of hydrogen, water gas, air gas or mixed gas, brought to a suitable temperature, is passed with an excess of steam over a catalyst. The carbon dioxide can be eliminated from the gaseous reaction products without difficulty but the carbon monoxide which is always present requires complex and expensive treatments for its complete elimination. Moreover the apparatus containing the catalyst in this steam catalysis is expensive and its surveillance requires constant care and attention.

According to the present invention it has been found that the reaction expressed by the aforesaid equation can equally well be effected if water is used in the liquid state and the reaction is carried out at a temperature below the critical temperature of the water and at a pressure higher than the vapour pressure of water at that temperature, catalysts being preferably employed.

Thus, for instance, if the reaction temperature is 250° C. the pressure must be above 40.5 kgm. per square cm. Under these conditions the reaction is accelerated by the presence of catalysts. These may be metals, such as reduced copper, nickel, iron, thallium, platinum or palladium, or metallic oxides or metallic salts of weak inorganic acids or mixtures of any of the aforesaid substances may be used.

To carry the process into effect it is sufficient to cause the gases containing carbon monoxide to bubble preferably in the form of small bubbles through a water column of suitable structure and height the water being subjected to the aforesaid conditions of temperature and pressure. The catalyst is in the water. The gases issuing from the catalysis apparatus are caused to pass through a heat exchanger wherein they give up the greater part of their heat to the freshly entering gases and then proceed to the apparatus for eliminating the carbon dioxide.

No treatment is required for the elimination of possible residue of carbon monoxide, because with the present process the catalysis occurs in a complete manner. This is one of the advantages offered by the process, and it is of great importance, because, no matter what subsequent use is to be made of the hydrogen, the long, costly and complex processes of purification, indispensable when steam catalysis is used, are avoided.

Another advantage of the present process is the smaller expenditure of heat in comparison with the process of catalysis by means of steam. It is known in fact that in the latter process it is necessary to use a considerable quantity of steam which must chiefly be generated in boilers with consequent large consumption of fuel. With the present process the expenses of plant installation and for operating the steam boilers are avoided. The amount of steam carried away by the gases leaving the catalysis apparatus is not very large, especially when working at sufficiently high pressures, and thus the heat loss arising from the production of steam is negligible.

The apparatus necessary for carrying out this process is relatively inexpensive and its operation is simple.

For example a convenient apparatus for carrying out this invention is shown in partial diagrammatic representation in the accompanying drawing.

In the drawing 1 represents a suitable compressor for compressing the gas containing carbon monoxide. Usually these gases are here compressed to a pressure of from 20 to 150 or more atmospheres.

From the compressor 1 the carbon monoxide containing gases are passed into a heat exchange of the usual type wherein the gases are preheated by the products of reaction.

From the heat exchange 2 the preheated gases now pass into the reaction vessel 3 which is a suitable structure to withstand the necessary pressure. The gases are conveyed into the reaction vessel 3 by a suitable pipe which preferably extends to the bottom of the vessel, and which pipe terminates in a perforated end piece 5 which, as shown, conveniently takes the form of a ring. The gases pass through the perforations in the end piece 5 and react with the water in the vessel, the contact with the water being prolonged by conveniently disposed baffles as shown in the drawing.

The object of the perforated end piece is to divide the entering gases into very small bubbles which on contacting with the water react to form carbon dioxide and hydrogen. The water in the vessel is advantageously preheated to a temperature of between 180° to 360° C. and any suitable heating means can, if desired, be disposed exteriorly or interiorly of the reaction vessel. For instance an electrical heating device can be used.

The water in the vessel advantageously carries either in solution or in suspension a catalyst for accelerating the reaction while when desired the baffles alluded to above can maintain the catalyst in suspension.

The reaction in the vessel is rapid and the hot exit gases rise and pass into the heat exchanger 2 to preheat further incoming gases. From thence the exit gases pass into a suitable carbon dioxide separator 4 in which the carbon dioxide is absorbed under pressure. A solution of caustic alkali can be used for removal of the carbon dioxide.

The removal of the carbon dioxide leaves practically pure hydrogen, or hydrogen and nitrogen according to the nature of the initial gases.

The elimination of carbon dioxide is favoured by the fact that the gaseous mixture obtained is compressed.

An example of the process in accordance with this invention is given as follows:

A water gas of the following composition:

38.5% carbon monoxide
51.2% hydrogen
5.4% nitrogen
4.9% carbon dioxide is passed at a pressure of 150 to 200 atmospheres through a liquid water column heated to a temperature of 230° to 280° C., a mixture of iron, copper and thallium hydroxide being suspended in such water. The gases leaving the apparatus are cooled so as to condense the water vapour which they contain. The composition of the cooled gases results by analysis as follows:

0.008% carbon monoxide
66.85% hydrogen
4.18% nitrogen
28.89% carbon dioxide

The quantity of $CO_2$ shown by analysis is smaller than the quantity corresponding to the hydrogen obtained, which can be explained on consideration that a certain portion of $CO_2$ is dissolved in the water condensed.

A complete catalysis of CO has been obtained also with the other catalysts indicated.

Similarly with a mixed gas of following composition:

28.2% carbon monoxide
15.6% hydrogen
50.1% nitrogen
6.1% carbon dioxide a gas of following composition has been obtained:

0.11% carbon monoxide
34.98% hydrogen
40.24% nitrogen
24.66% carbon dioxide

With the present process it is possible to catalyze also water gas, air gas, mixed gas or other gases containing carbon monoxide, so that hydrogen or nitrogen-hydrogen mixtures, such as are used in the synthesis of ammonia can be obtained. Furthermore the process may be carried out in such a manner that an incomplete catalysis of the carbon monoxide is obtained, thereby yielding a carbon monoxide-hydrogen mixture such as is used for organic synthesis of methanol and other oxygenated organic products.

The gases and gaseous mixtures obtained being compressed, are particularly adapted for use in those industrial processes (ammonia synthesis, methanol synthesis, hydrogenations, etc.) in which the employment of high pressures are useful and necessary.

Having now particularly described and ascertained the nature of the said invention and in what manner the same is to be performed, what is claimed is:

1. An improved process for preparing gaseous mixtures containing hydrogen which comprises passing a carbon monoxide-containing gas into contact with water in the presence of a catalyst and reacting the carbon monoxide and the water at a temperature above 200° C. but below the critical temperature of water and at a pressure greater than the vapour pressure of the water at the temperature of the reaction.

2. An improved process for preparing gaseous mixtures containing hydrogen which comprises passing a carbon monoxide-containing gas into contact with water in the presence of a catalyst and reacting the carbon monoxide and the water at a temperature above 200° C. but below the critical temperature of water and maintaining the water in liquid state.

3. An improved process for preparing hydrogen-containing gas which comprises passing a carbon monoxide-containing gas into contact with water in the presence of a catalyst and reacting the carbon monoxide and the water at a temperature of about 250° C. and a pressure of more than 40.5 kilos per square centimeter.

4. An improved process for preparing hydrogen-containing gas which comprises passing a carbon monoxide-containing gas and at an elevated pressure in the presence of a catalyst into contact with excess water maintained at a temperature above 200° C. but below the critical temperature of water and at a pressure greater than the vapour pressure of the water at the temperature of the reaction.

MARIA CASALE SACCHI,
*Administratrix of Luigi Casale, Deceased.*